United States Patent
Liu

(10) Patent No.: US 9,344,715 B2
(45) Date of Patent: May 17, 2016

(54) ANGULAR TABLE FOR IMPROVING INTRA PREDICTION

(71) Applicant: Futurewei Technologies, Inc., Plano, TX (US)

(72) Inventor: Lingzhi Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 512 days.

(21) Appl. No.: 13/670,382

(22) Filed: Nov. 6, 2012

(65) Prior Publication Data

US 2013/0114696 A1  May 9, 2013

Related U.S. Application Data

(60) Provisional application No. 61/556,511, filed on Nov. 7, 2011.

(51) Int. Cl.
*H04N 19/103* (2014.01)
*H04N 19/176* (2014.01)
(Continued)

(52) U.S. Cl.
CPC ....... *H04N 19/00018* (2013.01); *H04N 19/103* (2014.11); *H04N 19/136* (2014.11); *H04N 19/176* (2014.11); *H04N 19/593* (2014.11)

(58) Field of Classification Search
CPC ..... H04N 7/50; H04N 7/364; H04N 7/26244; H04N 7/26271; H04N 7/26335; H04N 7/262; H04N 7/2627; H04N 7/2623
USPC ................. 375/240.12, 240, 240.25, 240.01, 375/240.17, 240.16, 240.13
See application file for complete search history.

(56) References Cited

U.S. PATENT DOCUMENTS

| | | | | |
|---|---|---|---|---|
| 2008/0175319 A1* | 7/2008 | Sun | .................. | H04N 19/197 375/240.12 |
| 2011/0292994 A1* | 12/2011 | Lim | .................. | H04N 19/182 375/240.02 |
| 2012/0307894 A1* | 12/2012 | Chien | .................. | H04N 19/176 375/240.12 |

(Continued)

FOREIGN PATENT DOCUMENTS

WO   2012009540 A1   1/2012

OTHER PUBLICATIONS

Bross, et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting; Torino, IT, JCTVC-F803_d0, Jul. 14-22, 2011, 215 pages.

(Continued)

*Primary Examiner* — Mohammed Rahaman
*Assistant Examiner* — Jimmy S Lee
(74) *Attorney, Agent, or Firm* — Conley Rose, P.C.; Grant Rodolph; William H. Dietrich

(57) ABSTRACT

A method of intra prediction comprising computing a prediction block for a luma block, wherein computing the prediction block includes using a plurality of directional intra prediction modes and an angular table (angTable) comprising a plurality of entries, and wherein a value of each entry is determined via a mathematical derivation. An apparatus comprising a memory configured to store an angTable comprising a plurality of entries, wherein a value of each entry is determined via a mathematical derivation, and a processor configured to compute a prediction block for a luma block using a plurality of directional intra prediction modes and the angTable.

28 Claims, 11 Drawing Sheets

(51) Int. Cl.
*H04N 19/593* (2014.01)
*H04N 19/136* (2014.01)

(56) References Cited

U.S. PATENT DOCUMENTS

2013/0101036 A1* 4/2013 Zhou ............... H04N 19/00569
375/240.12
2013/0101232 A1* 4/2013 Cohen ................ H04N 19/70
382/233

OTHER PUBLICATIONS

Budagavi, "Angular intra prediction and ADI simplification," Joint Collaborative Team on Video Coding (JCT-VC) of ITU-T SG16 WP3 and ISO/IEC JTC1/SC29/WG11, 2nd Meeting; Geneva, CH, JCTVC-B118, Jul. 21-28, 2010, 4 pages.

Davies, "BBC's Response to the Call for Proposals on Video Compression Technology," Joint Collaborative Team on Video Coding (JCT-VC) of ITU-T SG16 WP3 and ISO/IEC JTC1/SC29/WG11, 1st Meeting; Dresden, DE, JCTVC-A125, Apr. 15-23, 2010, 31 pages.

Liu, "Improving the Intra Prediction Based on a Uniform Probability Model," Joint Collaborative Team on Video Coding (JCT-VC) of ITU-T SG16 WP3 and ISO/IEC JTC1/SC29/WG11, 7th Meeting; Geneva, CH, JCTVC-G374, Nov. 21-30, 2011, 11 pages.

Richardson, "H264/MPEG-4 Part 10 White Paper—Prediction of Intra Macroblocks," Internet Citation, XP-002281494, Retrieved from: http://www.vcodex.com/h264.html/h264_intrapred.pdf, Apr. 30, 2003, 6 pages.

Zhao, et al., "Fast Mode Decision Algorithm for Intra Prediction in HEVC," Visual Communications and Image Processing (VCIP), 2011 IEEE, Nov. 6-9, 2011, 4 pages.

Foreign Communication From a Counterpart Application, PCT Application PCT/US2012/063747, International Search Report dated Mar. 18, 2013, 6 pages.

Foreign Communication From a Counterpart Application, PCT Application PCT/US2012/063747, Written Opinion dated Mar. 18, 2013, 11 pages.

"Series H: Audiovisual and Multimedia Systems Infrastructure of Audiovisual Services-Coding of Moving Video, Advanced Video Coding for Generic Audiovisual Services," ITU-T H.264, Nov. 2007, 564 pages.

Min, J., et al., "Unification of the Directional Intra Prediction Methods in TMuC," JCTVC-B100, Geneva, Switzerland, 2nd Meeting, Jul. 21-28, 2010, 3 pages.

Tan, T., "TE5: Results for Simplification of Unified Intra Prediction," JCTVC-C042, Guangzhou, China, 3rd Meeting, Oct. 7-15, 2010, 4 pages.

* cited by examiner

ANGULAR TABLE FOR IMPROVING INTRA PREDICTION

CROSS-REFERENCE TO RELATED APPLICATIONS

The present application claims priority to U.S. Provisional Patent Application No. 61/556,511 filed Nov. 7, 2011 by Lingzhi Liu and entitled "A New Method for Generating the Angular Table for Improving the Intra Prediction in Video Coding", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. Due to limited network resources, it is desirable to develop compression and decompression techniques that increase compression ratios without sacrificing video quality.

In high efficiency video coding (HEVC), an angular table may be used in intra prediction. However, an angular table currently used in HEVC may have been generated in an ad hoc manner and may be improved if a general framework for deriving an angular table is provided.

SUMMARY

In one embodiment, the disclosure includes a method of intra prediction comprising computing a prediction block for a luma block, wherein computing the prediction block includes using a plurality of directional intra prediction modes and an angular table (angTable) comprising a plurality of entries, and wherein a value of each entry is determined via a mathematical derivation.

In another embodiment, the disclosure includes an apparatus comprising a memory configured to store an angTable comprising a plurality of entries, wherein a value of each entry is determined via a mathematical derivation, and a processor configured to compute a prediction block for a luma block using a plurality of directional intra prediction modes and the angTable.

In yet another embodiment, the disclosure includes a method comprising mathematically deriving a plurality of integers, storing the plurality of integers in a memory, and computing a prediction block for a luma block, wherein computing the prediction block includes using a plurality of directional intra prediction modes and the plurality of integers.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
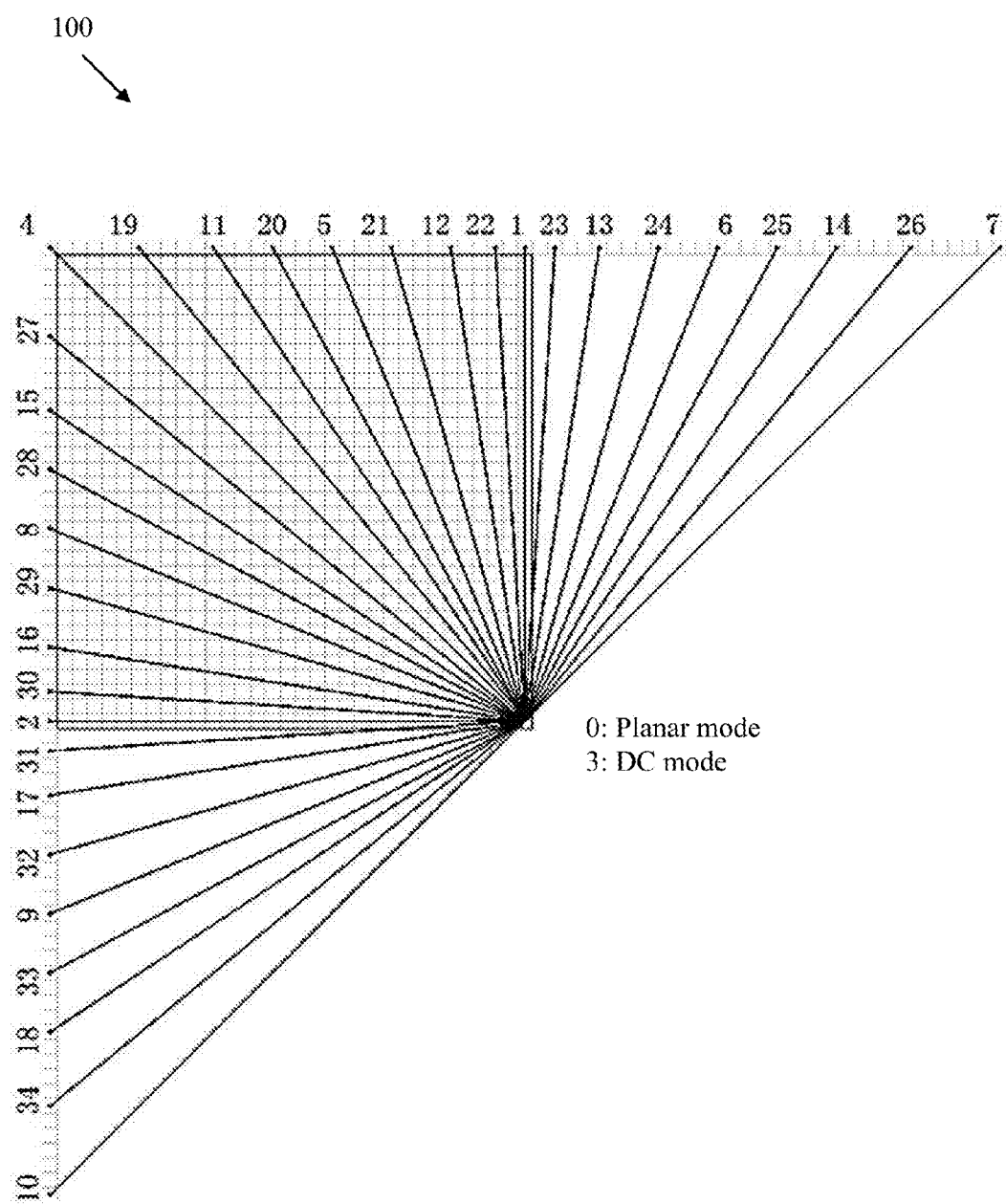
FIGS. 1A and 1B are diagrams of a plurality of intra prediction modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . , 255) that represents an image quality or color at the corresponding reference point. The color space may be represented by three components including a luminance (luma or Y) component and two chrominance (chroma) components, denoted as Cb and Cr (or sometimes as U and V).

In use, an image or video frame may comprise a large amount of pixels (e.g., 2,073,600 pixels in a 1920×1080 frame), thus it may be cumbersome and inefficient to encode and decode (generally referred to hereinafter as code) each pixel independently. To improve coding efficiency, a video frame is usually broken into a plurality of rectangular blocks or macroblocks, which may serve as basic units of processing such as coding, prediction, transform, and quantization. For example, a typical N×N block may comprise $N^2$ pixels, where N is an integer greater than one and is often a multiple of four. In the YUV or YCbCr color space, each luma (Y) block corresponds to two chroma blocks including a Cb block and a Cr block. The Cb block and Cr block also correspond to each other. The chroma blocks and their corresponding luma block may be located in a same relative position of a video frame, slice, or region. Further, depending on a sampling rate used to code the YCbCr components, the size of a Cb block, its corresponding Cr block, and/or its corresponding Y block may be the same or different. For example, in a 4:2:0 sampling rate, each N×N chroma (Cb or Cr) block may correspond to a 2N×2N luma block, while in a 4:4:4 sampling rate, each N×N chroma block may correspond to a N×N luma block.

In working drafts of the International Telecommunications Union (ITU) Telecommunications Standardization Sector (ITU-T) and the International Organization for Standardization (ISO)/International Electrotechnical Commission (IEC) HEVC, which is poised to be the next video coding standard, new block concepts have been introduced. For example, coding unit (CU) may refer to a sub-partitioning of a video frame into rectangular blocks of equal or variable size. In HEVC, a CU may replace a macroblock structure of previous standards. Depending on a mode of inter or intra prediction, a CU may comprise one or more prediction units (PUs), each of which may serve as a basic unit of prediction. For example, for intra prediction, a 64×64 CU may be symmetrically split into four 32×32 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

A block in a video frame may be spatially correlated with other blocks within the same frame such that pixel values across some blocks may vary only slightly and/or exhibit repetitious textures. Modern methods of video-compression exploit these spatial correlations using various techniques which may be known collectively as intra-frame prediction (in short as intra prediction). When coding a current block (luma or chroma) using intra prediction, a prediction block or prediction unit may be generated based on one or more previously coded reference blocks. The prediction block may be an estimated version of the current block. A residual block may be generated by subtracting the current block from the prediction block, or vice versa, which represents prediction residuals or errors. Since an amount of data needed to represent the prediction residuals may typically be less than an amount of data needed to represent the original block, the residual block may be coded instead of the current block to achieve a higher compression ratio.

In a video region where neighboring blocks are identical or near-identical, use of intra prediction may result in a residual block comprising many zero and/or near-zero pixel values. Furthermore, transformation, quantization, and/or scanning of the residual block may remove many of the zero and/or near-zero coefficients from the encoded data stream, thereby resulting in further compression of video data. Thus, more accurate prediction of the original image may result in higher coding efficiencies. To improve accuracy of intra prediction, video/image coding standards may utilize a plurality of intra prediction modes, each of which may generate a unique texture. For example, up to 35 intra prediction modes for the luma component and up to six intra prediction modes for the chroma components may be used in HEVC.

FIG. 1A illustrates a diagram of a plurality of intra prediction modes 100 (also referred hereafter as intra modes), which may be used for luma blocks in a HEVC UIP scheme. The intra prediction modes 100 may comprise up to 35 intra prediction modes, which includes 33 directional modes and two non-directional modes, such as a direct current (DC) prediction mode and a planar prediction mode. Each mode may be assigned a mode name, which may be application dependent. In HEVC, the planar mode may be assigned or appointed as mode 0, the DC mode as mode 3, the horizontal mode as mode 2, and so forth. In use, an encoder may use a rate-distortion optimization (RDO) process to select a prediction mode that generates the most accurate prediction for each current block. For example, the sum of absolute errors (SAE) may be calculated for each mode in the intra prediction modes 100, and the one with the least SAE may be selected. In general, a larger number of intra prediction modes may lead to more accurate intra prediction. For example, recent research has shown that conventions using 35 intra-frame prediction modes, such as the intra prediction modes 100, may more accurately predict complex textures than conventions using fewer prediction modes, such as the ITU-T H.264/advanced video coding (AVC) standard, which uses only up to nine intra prediction modes. In HEVC, six intra prediction modes for the chroma components may include a chroma from luma prediction mode (referred to as a linear model (LM) mode), a vertical prediction mode, a horizontal prediction mode, a diagonal mode, a DC prediction mode, and a direct mode (DM) derived from the luma component.

Figure 1B:
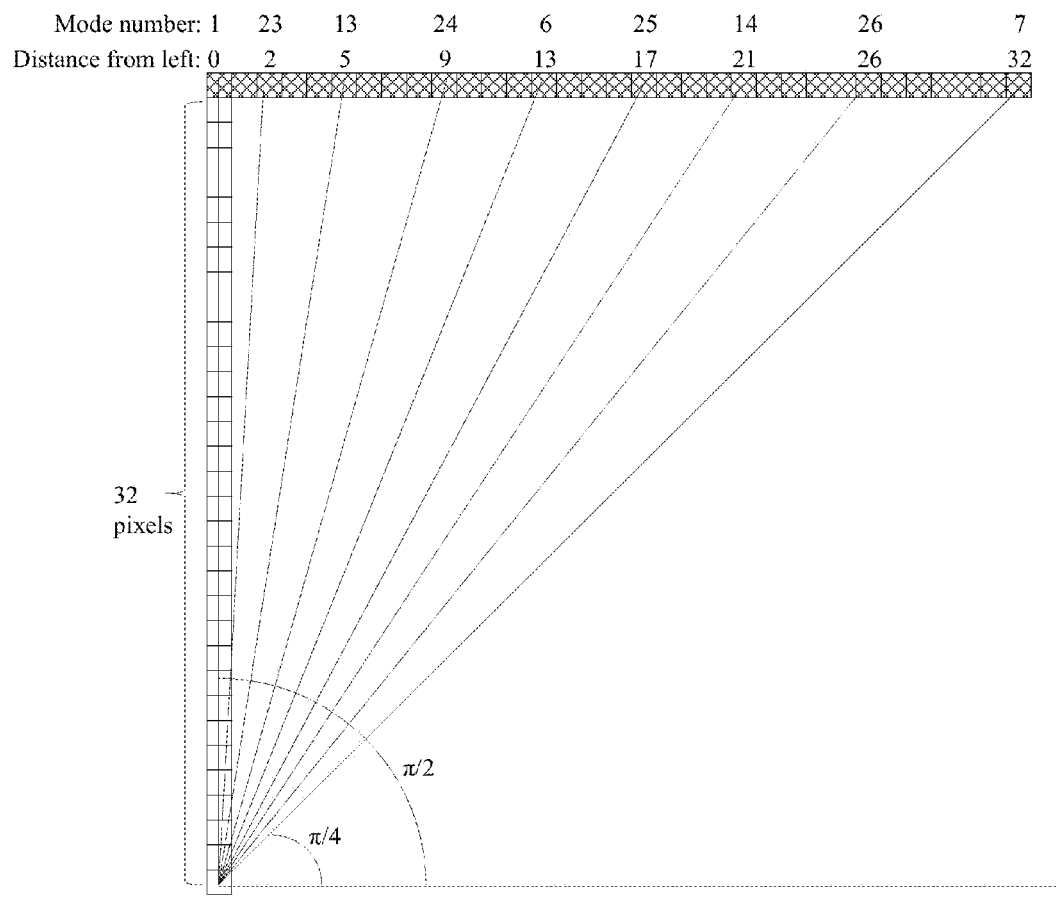

As shown in FIG. 1A, the 33 directional modes may be symmetrical about the vertical, horizontal, and diagonal directions. Accordingly, only nine directions may be needed to represent the 33 directions, and other directions may be obtained via addition, subtraction, and/or shifting operations. FIG. 1B illustrates nine of the 33 directional modes, which represents a quarter of the n-radian or 180-degree angular range covered by the intra prediction modes 100. Specifically, the nine modes include modes 1, 23, 13, 24, 6, 25, 14, 26, and 7, which range from 45 degrees (zero degree means right horizontal side) to 90 degrees. Each of the nine modes has a pre-defined angle with the right horizontal line. In HEVC, the angles may be defined as arccot(k/32), wherein k has values of 0, 2, 5, 9, 13, 17, 21, 26, and 32 corresponding to the nine modes 1, 23, 13, 24, 6, 25, 14, 26, and 7, respectively. For example, the mode 14 has an angle of arccot($21/32$)=56.7 degrees. If a block currently being coded has a size of 32×32, in the mode 14, the reference pixel has a lateral distance of 14 from the rightmost column of the current block. Using the angles of the nine directional modes shown in FIG. 1B, one skilled in the art will recognize that the angles of the other 24 directional modes not shown in FIG. 1B can be determined using the symmetry features of the intra prediction modes 100.

In HEVC, an angular table (denoted herein as angTable) comprising nine entries may be used in the intra prediction, and a value of each entry may be pre-defined. In current designs of HEVC software models (HMs), entry values are defined as:

$$\text{angTable} = \{0, 2, 5, 9, 13, 17, 21, 26, 32\}. \quad (1)$$

It can be considered that, e.g., in a 32×32 block as shown in FIG. 1B, each entry value of the angTable in equation (1) may correspond to a distance between the rightmost column of the current block to the reference pixel in the directional mode. Thus, the entries are configured according to the directional modes and not based on any mathematical derivation. Using the angTable in equation (1), adding, shifting, and multiplication operations may be used to generate or compute prediction pixels for all 33 directional modes, providing a balance between performance and complexity.

Figure 2:
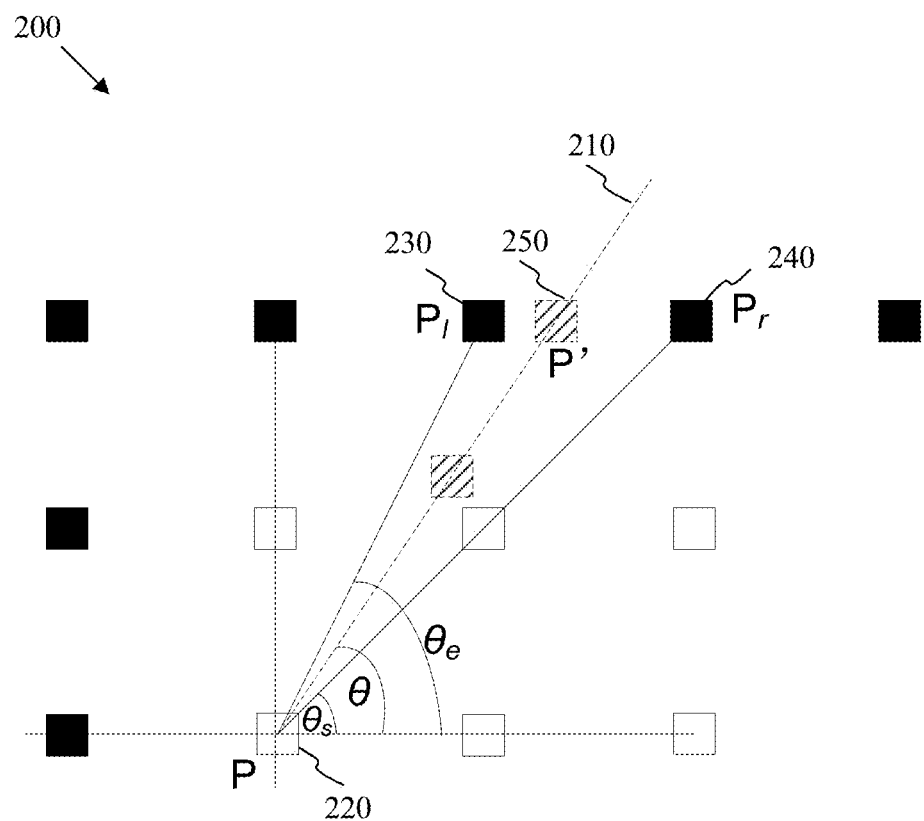
FIG. 2 is a schematic diagram of a unified intra prediction (UIP) intra prediction scheme.

FIG. 2 illustrate a UIP intra prediction scheme 200, which may be implemented to predict pixels in a current block using reference pixels in the left and upper neighboring blocks. If a texture feature has a line 210 with angle θ as shown in FIG. 2, the line 210 may reach a pixel 220 through two reference pixels 230 and 240 (may or may not be next to each other). An imaginary pixel 250 located on the line 210 may be placed between the reference pixels 230 and 240. In this case, a prediction value of the pixel 220, denoted as P, may be computed or calculated by a weighted prediction method. The prediction value P may be generated from values of the pixels 230 and 240, which are denoted as $P_L$ and $P_r$ respectively. For example, P may be calculated using equations:

$$w_l = \frac{\cot(\theta_s) - \cot(\theta)}{\cot(\theta_s) - \cot(\theta_e)} \quad (2)$$

$$w_r = 1 - w_l \quad (3)$$

$$P = w_l P_l + w_r P_r \quad (4)$$

where $\theta_s$ is the angle of the pixel 230, which may be regarded as a left starting point, and $\theta_e$ is the angle of the pixel 240, which may be regarded as a right ending point. One weighing factor, denoted as $w_l$, may be defined according to a distance between the pixels 230 and 250, and another weighing factor, denoted as $w_r$, may be defined according to a distance between the pixels 240 and 250. Suppose a vertical distance between the pixels 240 and 220 is an integer L, then a lateral distance between the pixels 240 and 230 is $L(\cot(\theta_s)-\cot(\theta_e))$, and a lateral distance between the pixels 240 and 250 is $L(\cot(\theta_s)-\cot(\theta_e))$. Note that $w_r$ may be removed, since it may be easily replaced by $(1-w_l)$. The directions defined by $\theta_s$ and $\theta_e$ may represent any two neighboring directions in the 33 directional modes shown in FIG. 1A. In current HM designs, the angTable in equation (1) may be used to determine an optimal directional mode, and different angles (i.e., different θ values) corresponding to different angTable entries may be used in the process. Further, an angle (denoted as $\theta_i$) corresponding to each entry of the angTable in equation (1), where i=1, 2, . . . , 9 is an entry number, can be written as:

$$\theta_i = \operatorname{arccot}(\text{angTable}[i]/32) \quad (5)$$

In equation (5), the denominator of 32 is used because the accuracy of the angles is 1/32. One may use higher accuracy with corresponding adjusted angTable entries. For example, if the accuracy is 1/64, the denominator of 64 may be used, and the angTable entries may be adjusted accordingly.

Figure 3:
FIG. 3 is an image of a video frame in a BasketballDrill video sequence.

However, there may be remaining issues or problems associated with the angTable as currently designed. For example, the corresponding angles of the angTable entries may not be optimized for video coding. As shown in FIGS. 1A and 1B, distribution of intra prediction modes show highest density of directions (i.e., angular spacing between directions) near the vertical and horizontal directions, signaling the highest coding priorities for these two directions. However, the density of directions is relatively sparse for diagonal angles. In fact, from 90 to 45 degrees, the eight angular spacings between adjacent directions are 3.6, 5.3, 6.8, 6.4, 5.9, 5.3, 5.8, 5.9 degrees. In this case, an angular spacing between the mode 7 (45.0 degrees) and the mode 26 (50.9 degrees) is greater than the angular spacing between the mode 21 (56.7 degrees) and the mode 17 (62.0 degrees). Thus, coding performance may decrease for images or video sequences with varied diagonal textures, such as a BasketballDrill sequence shown in FIG. 3. The BasketballDrill sequence (with resolution 832×480) is one of the standard testing sequences in Class C of HMs. In this sequence, the basketball court present diagonal textures such as court lines. In fact, in natural or other images/videos, textures with line features close to the diagonal directions, such as the modes 26 and 7, may be more probable than other directions, such as the modes 6 and 25. Thus, higher priorities may need to be given to diagonal modes. Since the directional modes may have already been fixed, the angTable entries may need to be modified to address coding inefficiencies of diagonal textures. Finally, the angTable in (1) may have been generated in an ad hoc manner.

Disclosed herein are systems and methods to improve intra prediction in video coding by modifying the angTable. In an embodiment, the disclosure provides a new angTable based on a uniform probability model. Part of the entries in the new angTable may be derived using the mathematical model and derivations disclosed herein. Thus, for different applications, different angTable entries may be derived to optimize coding performance. In an embodiment of HEVC intra prediction scheme, the angTable entries are determined to be {0, 2, 5, 9, 13, 18, 23, 28, 32}. In intra prediction of a block, a first method is to use only the new table, and a second method is to select either the new angTable or the original angTable based on intra prediction modes of the left and upper neighboring blocks. Embodiments of the disclosed angTable may improve coding gain for video sequences comprising various textures, such as diagonal line features.

Figure 4:
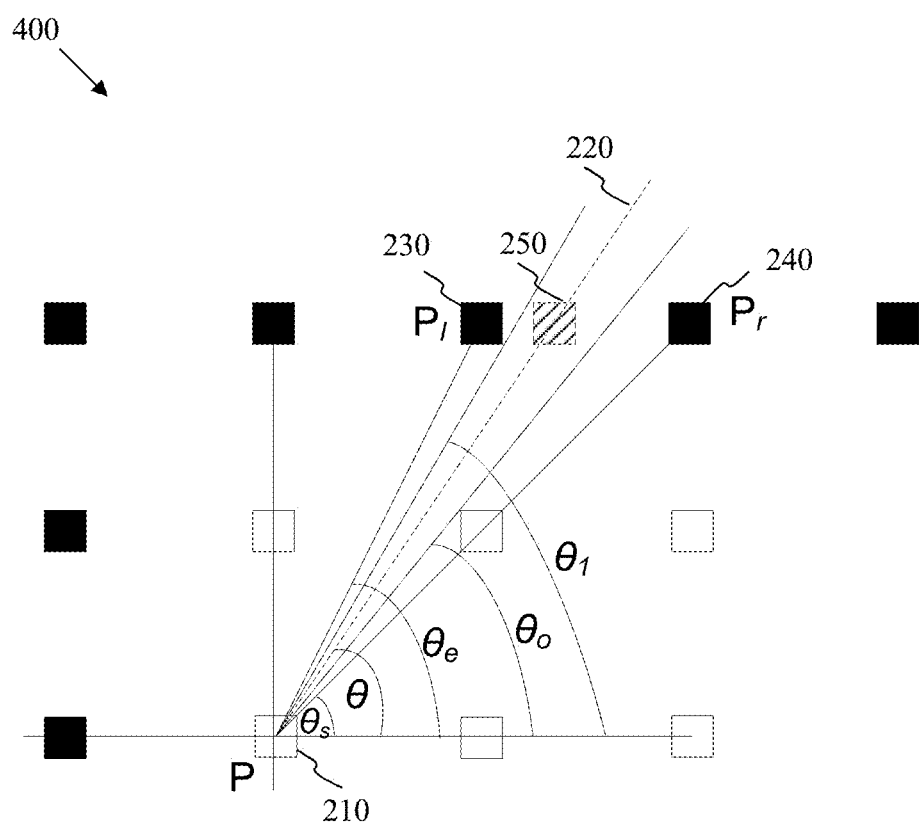
FIG. 4 is a schematic diagram of an embodiment of a UIP scheme.

FIG. 4 illustrates an embodiment of a UIP scheme 400, which may be implemented in a video encoder or decoder (generally referred to herein as a codec). Some aspects of the UIP scheme 400 may be the same or similar to the UIP scheme 200, in the interest of clarity, mainly different aspects will be further described. FIG. 4 may be used herein to illustrate how entries of an angTable may be mathematically derived or determined. In the UIP scheme 400, θ resides in an angular interval $[\theta_0, \theta_1]$ with $\theta_0$ being the lower boundary angle and $\theta_1$ being the upper boundary angle. It should be noted that the lower and/or upper boundary angles may have any value, which may or may not be the same with the angles of directional intra prediction modes.

In an embodiment, the interval $[\theta_0, \theta_1]$ is partitioned into a plurality of equally-spaced sub-intervals using equations:

$$\Delta\theta = \frac{\theta_1 - \theta_0}{N} \quad (6)$$

$$\theta(n) = \theta_0 + n \cdot \Delta\theta \quad (7)$$
for n = 1, 2, ... , N.

where N denotes a number of the plurality of sub-intervals (N potentially large or infinite), n denotes a sub-interval index ranging from 1 to N, Δθ denotes an angular width of each sub-interval, and θ(n) denotes an equivalent angle of the n-th sub-interval.

Based on equation (2), a weighting factor corresponding to the n-th subinterval can be computed using the following equation:

$$w_l(n) = \frac{\cot(\theta_s) - \cot(\theta(n))}{\cot(\theta_s) - \cot(\theta_e)} = \frac{\cot(\theta_s) - \cot(\theta_0 + n \cdot \Delta\theta)}{\cot(\theta_s) - \cot(\theta_e)} \quad (8)$$

for n = 1, 2, ... , N.

Further, the average weighting factors $w_l$ and $w_r$ of the N sub-intervals may be computed using equations:

$$w_l = avg(w_l(n)) = \sum_{n=1}^{N}\left(\frac{1}{N} * w_l(n)\right) \quad (9)$$

for $n = 1, 2, \ldots, N$.

$$w_r = 1 - w_l \quad (10)$$

The averaging algorithm (denoted as avg) used in equation (9) may depend on a distribution pattern of $w_l(n)$.

In an embodiment, the direction of a texture feature, defined by $\theta(n)$, may be located anywhere between the angular interval $[\theta_0, \theta_1]$, with an equal possibility to be any intermediate angle. In other words, $\theta(n)$ corresponds to a uniform distribution between $\theta_0$ and $\theta_1$. In this case, the average weight factor $w_l$ may be computed as:

$$w_l = \sum_{n=1}^{N}\left(\frac{1}{N} * w_l(n)\right) = \sum_{n=1}^{N}\left(\frac{1}{N} * \frac{\cot(\theta_s) - \cot(\theta_0 + n*\Delta\theta)}{\cot(\theta_s) - \cot(\theta_e)}\right) \quad (11)$$

$$= \sum_{n=1}^{N}\left(\frac{\Delta\theta}{\theta_1 - \theta_0} * \frac{\cot(\theta_s) - \cot(\theta_0 + n*\Delta\theta)}{\cot(\theta_s) - \cot(\theta_e)}\right)$$

Especially, when $N \to \infty$, $w_l$ can be computed through the following definite integral:

$$w_l = \lim_{N\to\infty} \sum_{n=0}^{N}\left(\frac{\Delta\theta}{\theta_1 - \theta_0} * \frac{\cot(\theta_s) - \cot(\theta_0 + n*\Delta\theta)}{\cot(\theta_s) - \cot(\theta_e)}\right) \quad (12)$$

$$= \int_{0}^{\theta_1-\theta_0}\left(\frac{1}{\theta_1 - \theta_0} * \frac{\cot(\theta_s) - \cot(\theta_0 + \theta)}{\cot(\theta_s) - \cot(\theta_e)}\right)d\theta$$

$$= \int_{\theta_0}^{\theta_1}\left(\frac{1}{\theta_1 - \theta_0} * \frac{\cot(\theta_s) - \cot(\theta)}{\cot(\theta_s) - \cot(\theta_e)}\right)d\theta$$

$$= \frac{\cot(\theta_s)}{\cot(\theta_s) - \cot(\theta_e)} - \frac{1}{(\theta_1 - \theta_0)*(\cot(\theta_s) - \cot(\theta_e))} * \left(\int_{\theta_0}^{\theta_1}(\cot(\theta))d\theta\right)$$

$$= \frac{1}{\cot(\theta_s) - \cot(\theta_e)} * \left(\cot(\theta_s) - \frac{\ln(\sin(\theta_1)) - \ln(\sin(\theta_0))}{\theta_1 - \theta_0}\right)$$

Based on the similar forms of equations (2) and (12), it is noted that the angular interval $[\theta_0, \theta_1]$ may have an equivalent averaging prediction angle (EAPA, also denoted as $\theta_{equ}$) computed as:

$$\theta_{equ} = \text{arccot}\left(\frac{\ln(\sin(\theta_1)) - \ln(\sin(\theta_0))}{\theta_1 - \theta_0}\right)$$

Thus, we have equations:

$$\cot(\theta_{equ}) = \frac{\ln(\sin(\theta_1)) - \ln(\sin(\theta_0))}{\theta_1 - \theta_0}; \quad (13)$$

and $$w_l = \frac{\cot(\theta_s) - \cot(\theta_{equ})}{\cot(\theta_s) - \cot(\theta_e)}. \quad (14)$$

Although a uniform distribution of $\theta(n)$ between $\theta_0$ and $\theta_1$ is used as an example, it should be understood that other probability distributions of $\theta(n)$, such as a normal, or Gaussian, distribution, are also possible. Depending on the distribution model selected, a corresponding $\cot(\theta_{equ})$ value may be determined, which may be different from equation (13).

Figure 5:
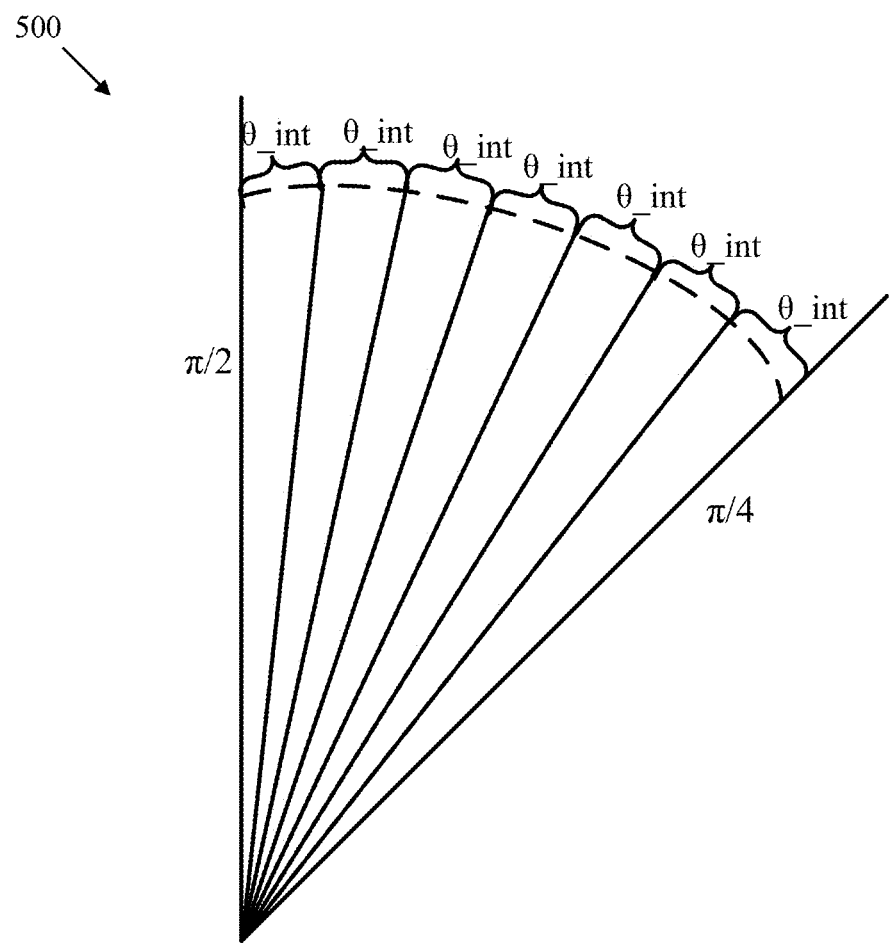
FIG. 5 is a diagram of an embodiment of a fan-shape.

FIG. 5 illustrates an embodiment of a fan-shape 500 with an angular an angular range $[\pi/4, \pi/2]$ in radians or [45, 90] in degrees. Since there may be up to 33 directional intra prediction modes in HEVC for the luma component, the $\pi/4$ radian-fan-shape may correspond to nine of the 33 modes. In an embodiment, relatively higher priorities are given to the $\pi/4$ and $\pi/2$ angles, and these two degrees correspond to two of nine entries in a disclosed angTable. The other seven entries may be obtained by dividing the fan-shape 500 into seven intervals, each of which may be equal or unequal in angular width. Note that if a different number of directional intra prediction modes were used, for example, in a different video coding standard, the angular range may be divided into any other appropriate number of intervals.

If the fan-shape 500 is equally divided into seven intervals, the width of each interval may be written as: $\theta\_int=(\pi/2-\pi/4)/7=\pi/28$. Further, the i-th angular interval, wherein $i=0, 1, \ldots, 6$, has a lower boundary angle of $\pi/4+i*\theta\_int$ (i.e., $\theta_0=\pi/4+i*\theta\_int$) and an upper boundary angle of $\pi/4+(i+1)*\theta\_int$ (i.e., $\theta_1=\pi/4+(i+1)*\theta\_int$). The EAPA of the i-th angular interval, denoted as $\theta_{equ,i}$, can be calculated. The corresponding angles for the new angTable entries are then obtained as $(\pi/2, \theta_{equ,6}, \theta_{equ,5}, \ldots, \theta_{equ,0}, \pi/4)$.

In an embodiment, the middle seven entries of a disclosed angTable, denoted as angTable2[7−i] with $i=0, 1, \ldots, 6$, may have values:

$$angTable2[7-i]=\text{round}(\cot(\theta_{equ,i})*32) \quad (15)$$

Based on equations (13) and (15), the EAPA corresponding to each of the middle seven intervals may be calculated. For example, if $i=0$, $$\cot(\theta_{equ,0}) = \frac{\ln(\sin(\theta_1)) - \ln(\sin(\theta_0))}{\theta_1 - \theta_0} = \frac{\ln(\sin(\pi/4 + \theta\_int)) - \ln(\sin(\pi/4))}{\theta_1 - \theta_0} \quad (16)$$

$$= \frac{\ln(\sin(\pi/4 + \pi/28)) - \ln(\sin(\pi/4))}{\pi/28}$$

$$= 0.895$$

$$angTable2[8] = \text{round}(\cot(\theta_{equ,0})*32) \quad (17)$$

$$= \text{round}(0.895*32)$$

$$= 29$$

For another example, if i=2, $$\cot(\theta_{equ,2}) = \frac{\ln(\sin(\theta_1)) - \ln(\sin(\theta_0))}{\theta_1 - \theta_0} = \frac{\ln(\sin(\pi/4 + 3*\theta\_int)) - \ln(\sin(\pi/4 + 2*\theta\_int))}{\theta_1 - \theta_0} \quad (18)$$
$$= \frac{\ln(\sin*(\pi/4 + 3*\pi/28)) - \ln(\sin(\pi/4 + 2*\pi/28))}{\pi/28}$$
$$= 0.551$$

$$angTable2[6] = \text{round}(\cot(\theta_{equ,2})*32) \quad (19)$$
$$= \text{round}*(0.551*32)$$
$$= 18$$

Using equations (13) and (15), one embodiment of the disclosed angTable may be determined as:

$$angTable2 = \{0,2,5,9,13,18,23,29,32\} \quad (20)$$

In effect, the modified entries of the angTable change coding priorities given to certain directional modes such as the vertical, horizontal and diagonal modes, while giving equal probabilities to other directions. It should be understood that the modified angTable may work with the intra prediction modes as currently defined. Thus, no modification of intra prediction modes may be required. Although, if desired, the intra prediction modes may be modified, e.g., to fit a different video coding standard. In this case, embodiments of the disclosed angTable may be similarly configured within the scope of this disclosure. Equations (13) and (15) are general equations, so regardless of how intervals are arranged in a fan-shape, these equations may be used to compute a set of angular table entries.

Figure 6:
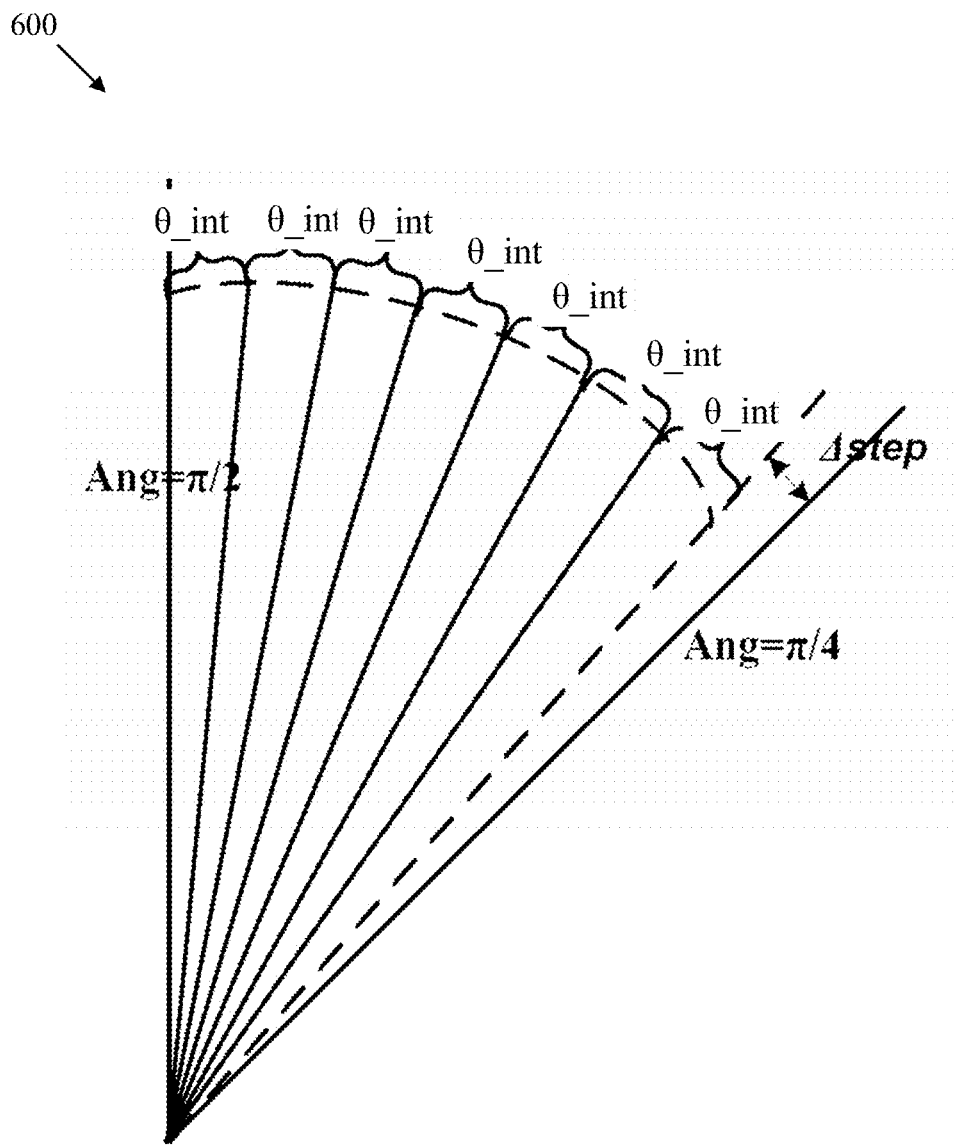
FIG. 6 is a diagram of another embodiment of a fan-shape.

In use, it is found that coding priority of the angle $\pi/4$ may be weaker than the angle $\pi/2$. Thus, to achieve a potentially higher coding gain, the fan-shape 500 shown in FIG. 5 may also be modified to be a fan-shape 600 as shown in FIG. 6, in which an angular range of $\Delta$step is deducted near the angle $\pi/4$, where $\Delta$step has a pre-configured value (e.g., greater than zero and smaller than $\pi/4$). If the angular range $[\pi/4+\Delta$step, $\pi/2]$ in the fan-shape 600 is equally divided into seven intervals, the width of each interval may be adjusted to: $\theta\_int=(\pi/2-(\pi/4+\Delta$step$))/7$. Further, the i-th angular interval, wherein i=0, 1, . . . , 6, has a lower boundary angle of $\pi/4+i*\theta\_int$ (i.e., $\theta_0=\pi/4+i*\theta\_int$) and an upper boundary angle of $\pi/4+(i+1)*\theta\_int$ (i.e., $\theta_1=\pi/4+(i+1)*\theta\_int$). The EAPA of the i-th angular interval, denoted as $\theta_{equ,i}$, can be calculated. The corresponding angles for the new angTable entries are then obtained as $(\pi/2, \theta_{equ,6}, \theta_{equ,5}, \ldots, \theta_{equ,0}, \pi/4)$.

Similar to the description with respect to FIG. 5, the EAPA corresponding to each of the middle seven intervals may be calculated after $\Delta$step is incorporated. For example, based on equations (13) and (15), different angular tables may be determined using $\Delta$step values in an appropriate range. Some exemplary $\Delta$step values and their corresponding angular tables are shown in Table 1.

TABLE 1

Exemplary $\Delta$step values and their corresponding angular tables entries.

| $\Delta$step | Angular table entries |
|---|---|
| 0 | {0, 2, 5, 9, 13, 18, 23, 29, 32} |
| 0.003 | {0, 2, 5, 9, 13, 18, 23, 28, 32} |
| 0.007 | {0, 2, 5, 9, 13, 18, 22, 28, 32} |
| 0.008 | {0, 2, 5, 9, 13, 17, 22, 28, 32} |
| 0.022 | {0, 2, 5, 9, 13, 17, 22, 27, 32} |
| 0.034 | {0, 2, 5, 9, 13, 17, 21, 27, 32} |

TABLE 1-continued

Exemplary $\Delta$step values and their corresponding angular tables entries.

| $\Delta$step | Angular table entries |
|---|---|
| 0.042 | {0, 2, 5, 9, 12, 17, 21, 26, 32} |
| 0.046 | {0, 2, 5, 9, 12, 16, 21, 26, 32} |

To determine an optimal value of $\Delta$step, angTables constructed using different $\Delta$step values may be tested in simulation. For example, simulations found that the angTable in (21) may perform better for videos with various textures than the table in (20).

$$angTable = \{0,2,5,9,13,18,23,28,32\} \quad (21)$$

While the HEVC intra prediction modes with 33 directional modes for the luma component are described above as an example, it should be understood that depending on block-size and/or the intra prediction scheme, any other number of prediction modes may also be used. Further, it should be noted that, if the fan-shape 600 is equally divided into a different number of intervals denoted as K (K is an integer greater than one), angTable entries may still be derived with pre-configured $\Delta$step values within the scope of this disclosure.

There may be various approaches regarding when a disclosed angTable may be used in intra prediction. In an embodiment, a video encoder or decoder may be configured to store only a disclosed angTable. In this case, the disclosed angTable replaces the original angTable used in HEVC. In another embodiment, the codec may be configured to store both the disclosed angTable and the original angTable. In this case, the original angTable or the new angTable may be used alternatively in intra prediction. Suppose a current luma block is being intra predicted, the new angTable may be used when it does not have any left or upper neighboring block, or if the intra prediction mode(s) of its left and/or upper neighboring blocks containing reference pixels are not available, or if at least one of their intra prediction modes is close to a diagonal direction (e.g., with modes 4, 7, 10, 11, 14, 15, 18, 19, 26, 27 or 34). If none of these conditions satisfies, the original angTable may be used. Regarding intra prediction of a chroma block, then new table may be used if the corresponding luma prediction mode is close to a diagonal direction. Alternatively, the chroma prediction may be configured to always use the new angTable.

In use, embodiments of disclosed lmDiv look-up tables can be tested and compared with HM anchors. To evaluate coding performance after introducing the new angTable, simulations were performed under All Intra High Efficiency (HE) and All Intra Low Complexity (LC) configurations. Simulation results included the average percentage Bjontegaard Delta (BD) rates on a plurality of resolution classes (Classes A, B, C, D, and E) for the three components of color space (Y, U, and V), as well as encryption (Enc) and decryption (Dec) times. In the simulations, the BD rates of intra prediction using various disclosed schemes were compared with a HM 4.0 anchor, which uses the angTable {0, 2, 5, 9, 13, 17, 21, 26, 32}.

In a first test case, intra prediction using only angTable {0, 2, 5, 9, 13, 18, 23, 28, 32} is compared with the HM 4.0 anchor. Table 2 shows results of the first test case, which suggested that the average BD rates showed no change or slight decreases. For example, the average BD rate of A, B, C, D, and E classes decreased by 0.04% for the U component and decreased by 0.02% for the V component in All Intra HE. Further, the Enc time decreased by about 1% and the Dec time decreased by about 5% in All Intra HE.

TABLE 2

Result of the first test case vs. HM 4.0 anchor.

|  | All Intra HE | | | All Intra LC | | |
| --- | --- | --- | --- | --- | --- | --- |
|  | Y | U | V | Y | U | V |
| Class A | 0.09% | −0.01% | 0.06% | 0.09% | 0.11% | 0.11% |
| Class B | 0.05% | 0.04% | 0.04% | 0.04% | 0.05% | 0.06% |
| Class C | −0.25% | −0.20% | −0.25% | −0.21% | −0.20% | −0.25% |
| Class D | 0.01% | −0.01% | −0.01% | 0.00% | 0.00% | −0.03% |
| Class E | 0.09% | −0.02% | 0.07% | 0.07% | 0.05% | 0.08% |
| Overall | 0.00% | −0.04% | −0.02% | 0.00% | 0.00% | −0.01% |
|  | 0.00% | −0.04% | −0.03% | 0.00% | 0.00% | −0.02% |
| Enc Time[%] | 99% | | | 100% | | |
| Dec Time[%] | 95% | | | 96% | | |

In the first test case, more significant coding gain was obtained for the BasketballDrill sequence, which was one of the testing sequences in Class C. Table 3 shows simulation results of the BasketballDrill sequence in comparison to the HM 4.0 anchor. The BD rate decreased by 1.0% for the Y component in All Intra HE and decreased by 0.9% in All Intra LC.

TABLE 3

BasketballDrill sequence result of the first test case vs. HM 4.0 anchor.
BasketballDrill832×480

| AI_HE | | | AI_LC | | |
| --- | --- | --- | --- | --- | --- |
| Y | U | V | Y | U | V |
| −1.02% | −0.80% | −0.90% | −0.90% | −0.77% | −0.98% |
| −1.0% | −0.8% | −0.9% | −0.9% | −0.8% | −1.0% |

In the first test case, eight of all twenty testing sequences showed coding losses. A maximum of 0.16% and 0.18% coding lose was found in the PeopleOnStreet sequence for All Intra HE and All Intra HE respectively. All other coding losses were less than 0.12%. The first case confirmed that the original angTable led to performance decrease when coding diagonal textures, such as those contained in the BasketballDrill sequence.

In a second test case, intra prediction alternatively using the original angTable {0, 2, 5, 9, 13, 17, 21, 26, 32} and a disclosed angTable {0, 2, 5, 9, 13, 18, 23, 28, 32} is compared with the HM 4.0 anchor. In the second test case, the condition for using the new angTable was when the intra prediction mode of a left and/or an upper luma block are not available, or if one of their modes is mode 4, 7, 10, 11, 14, 15, 18, 19, 26, 27 or 34. Otherwise, the original angTable was used. For intra chroma prediction, only the new table was used. Table 4 shows results of the second test case, which suggested that the average BD rates showed slight decreases. For example, the average BD rate of A, B, C, D, and E classes decreased by 0.04% for the Y component and decreased by 0.06% for the U component in All Intra HE. Further, the Enc time increased by about 1% and the Dec time decreased by about 5% in All Intra HE.

TABLE 4

Result of the second test case vs. HM 4.0 anchor.

|  | All Intra HE | | | All Intra LC | | |
| --- | --- | --- | --- | --- | --- | --- |
|  | Y | U | V | Y | U | V |
| Class A | 0.03% | −0.08% | 0.03% | 0.03% | 0.01% | 0.03% |
| Class B | 0.01% | 0.02% | −0.03% | 0.01% | 0.01% | 0.02% |
| Class C | −0.22% | −0.16% | −0.15% | −0.21% | −0.19% | −0.18% |
| Class D | −0.01% | −0.06% | −0.05% | −0.02% | 0.03% | −0.02% |
| Class E | 0.03% | −0.05% | 0.06% | 0.01% | −0.04% | 0.02% |
| Overall | −0.03% | −0.06% | −0.03% | −0.03% | −0.03% | −0.03% |
|  | −0.03% | −0.06% | −0.04% | −0.03% | −0.03% | −0.04% |
| Enc Time[%] | 101% | | | 102% | | |
| Dec Time[%] | 95% | | | 97% | | |

In the second test case, more significant coding gain was also obtained for the BasketballDrill sequence, as shown in Table 5. The BD rate decreased by 0.9% for the Y component in All Intra HE and decreased by 0.8% in All Intra LC. In the second test case, one of the tested sequences showed a 0.06% coding loss for both All Intra HE and LC, while most other sequences yielded the same performance with HM 4.0 anchor.

TABLE 5

BasketballDrill sequence result of the second test case vs. HM 4.0 anchor.
BasketballDrill832×480

| AI_HE | | | AI_LC | | |
| --- | --- | --- | --- | --- | --- |
| Y | U | V | Y | U | V |
| −0.92% | −0.55% | −0.73% | −0.82% | −0.57% | −0.79% |
| −0.9% | −0.7% | −0.5% | −0.8% | −0.7% | −0.7% |

Figure 7:
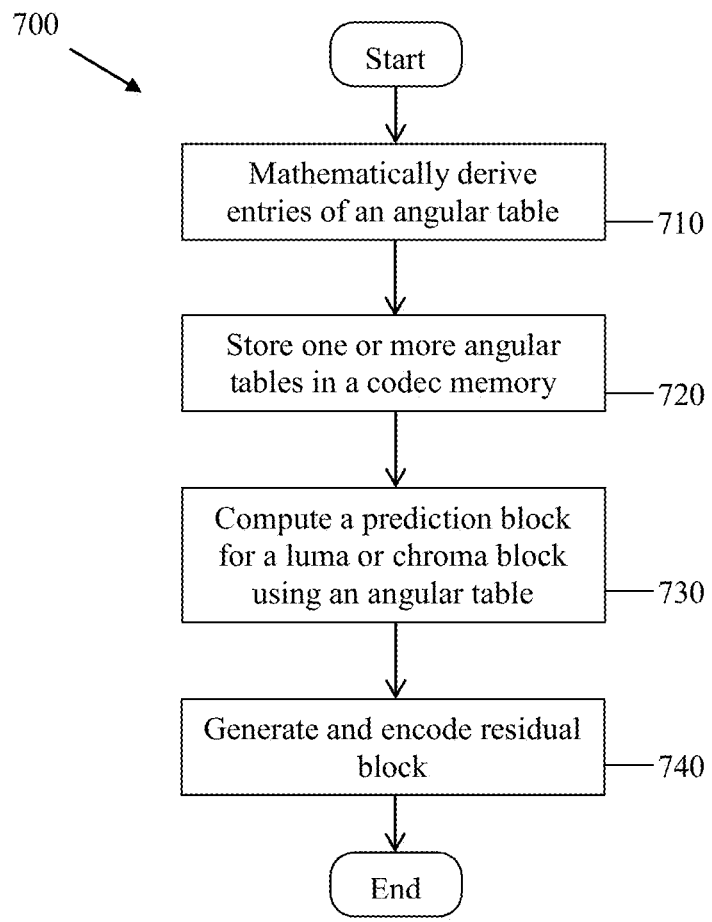
FIG. 7 is a flowchart of an embodiment of an intra prediction method.

FIG. 7 illustrates an embodiment of an intra prediction method 700, in which embodiments of the angTable may be used. The method 700 may start in step 710, where a plurality of integers may be mathematically derived using equations described above. For example, equations (13) and (15) may be used to derive integers. Next, in step 720, the derived integers may be stored in a memory of a codec. The integers may be combined with other pre-defined values (e.g., 0 and 32 for a HEVC UIP intra coding scheme) to form an angTable. One or more angTables may be stored in the memory. In some embodiments, two angTables, including the mathematically derived angTable and the original angTable used in current HMs, may be stored in the memory.

Next, in step 730, the one or two angTables may be used to compute a prediction block for a luma and/or a chroma block contained in an image or a video frame. In an embodiment, only a mathematically derived angTable, such as the angTable with entries {0, 2, 5, 9, 13, 18, 23, 28, 32}, is used for intra prediction of all luma and chroma blocks. In an alternative embodiment, two angTables, e.g., one with entries {0, 2, 5, 9, 13, 18, 23, 28, 32} and another with entries {0, 2, 5, 9, 13, 17, 21, 26, 32}, may be used alternatively in coding luma blocks. A processor in the codec may be configured to use the original angTable unless a luma block satisfies at least one of these conditions: the luma block does not have any left neighboring block, the luma block does not have any upper neighboring block, no left neighboring block of the luma block has an intra prediction mode, no upper neighboring block of the luma block has an intra prediction mode, a left neighboring block has an intra prediction mode in modes 4, 7, 10, 11, 14, 15, 18, 19, 26, 27, and 34, and an upper neighboring block has an intra prediction mode in modes 4, 7, 10, 11, 14, 15, 18, 19, 26, 27, and 34. Additionally, in some embodiments, all chroma blocks may be intra predicted using only the mathematically derived angTable (even if two angTables were available in the codec).

Next, in step 740, a residual block indicating a difference between the prediction block and the current block (luma or chroma) may be generated and encoded. It should be understood that the method 700 may include only a portion of necessary steps to complete video coding, thus other steps or processes, such as determining optimal directional intra prediction mode, transform of residual block, quantization, etc., may be incorporated into the coding process wherever appropriate.

Figure 8:
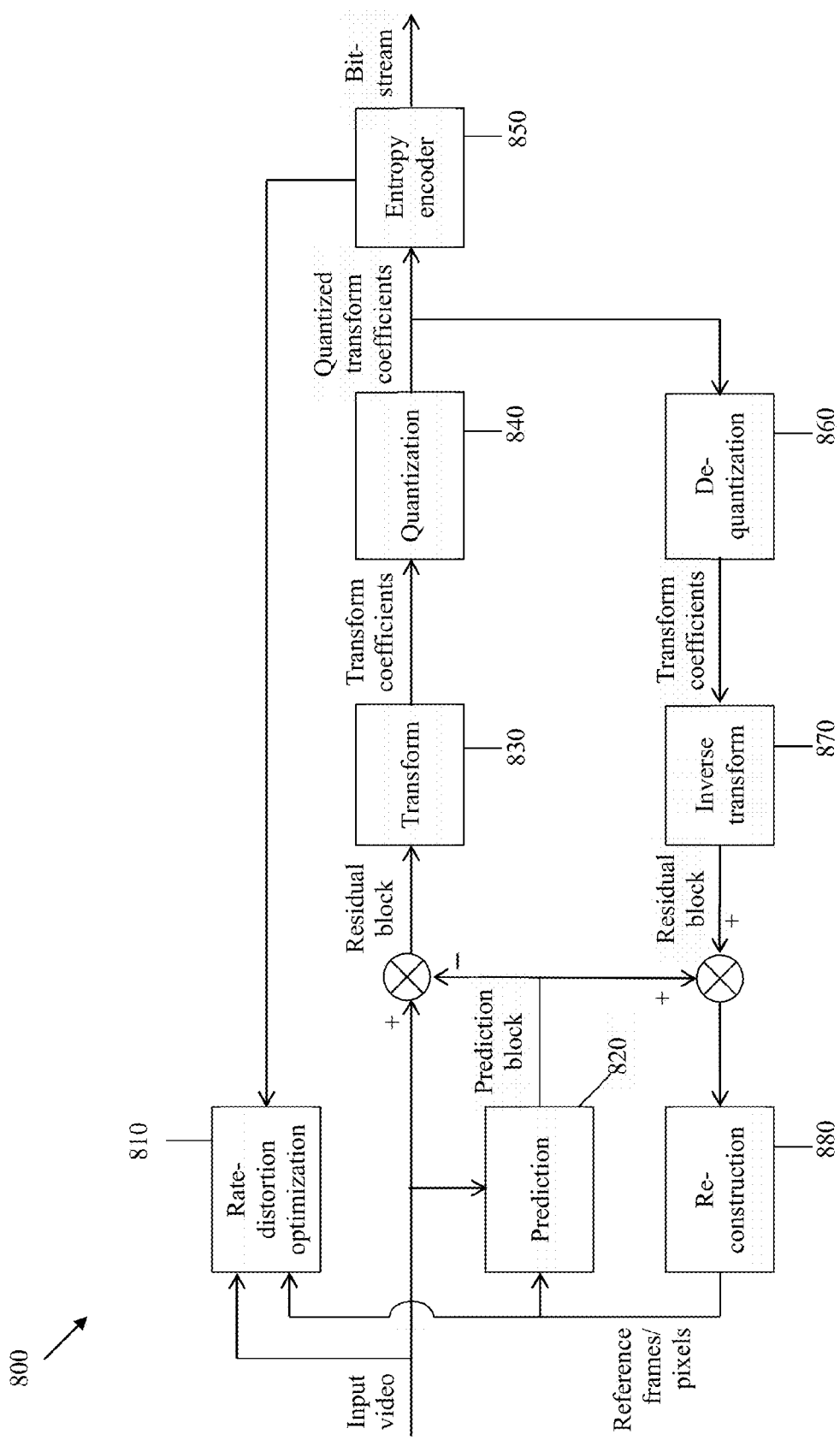
FIG. 8 is a schematic diagram of an embodiment of a video encoder.

FIG. 8 illustrates an embodiment of a video encoder 800, in which a disclosed angTable may be used. The video encoder 800 may comprise a rate-distortion optimization (RDO) module 810, a prediction module 820, a transform module 830, a quantization module 840, an entropy encoder 850, a de-quantization module 860, an inverse transform module 870, and a reconstruction module 880 arranged as shown in FIG. 8. In operation, the video encoder 800 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 810 may be configured to coordinate or make logic decisions for one or more of other modules. For example, based on one or more previously encoded frames, the RDO module 810 may determine how a current frame (or slice) being encoded is partitioned into a plurality of coding units (CUs), and how a CU is partitioned into one or more prediction units (PUs) and transform units (TUs). CU, PU, and TU are various types of blocks used in HEVC. In addition, the RDO module 810 may determine how the current frame is to be predicted. The current frame may be predicted via inter and/or intra prediction. For intra prediction, there are a plurality of available prediction modes or directions in HEVC (e.g., 35 modes for the Y component and six modes for the U or V component), and an optimal mode may be determined by the RDO module 810. For example, the RDO module 810 may calculate a sum of absolute error (SAE) for each prediction mode, and select a prediction mode that results in the smallest SAE.

The prediction module 820 may utilize either reference frames for inter prediction or reference pixels in the current frame for intra prediction. In an embodiment, the prediction module 820 is configured to use a disclosed angTable in computation of a prediction block for a current block from the input video. The prediction block comprises a plurality of predicted samples, each of which may be generated based on a plurality of reconstructed samples located in the left and upper neighboring blocks (already decoded) of the current block.

Upon generation of the prediction block, the current block may be subtracted by the prediction block, or vice versa, to generate a residual block. The residual block may be fed into the transform module 830, which may convert residual chroma samples into a matrix of transform coefficients. The transform may be a two-dimensional orthogonal transform, such as the discrete cosine transform (DCT). Then, the matrix of transform coefficients may be quantized by the quantization module 840 before being fed into the entropy encoder 850. The quantization module 840 may alter the scale of the transform coefficients and round them to integers, which may reduce the number of non-zero transform coefficients. As a result, a compression ratio may be increased. Quantized transform coefficients may be scanned and encoded by the entropy encoder 850 into an encoded bitstream. Further, to facilitate continuous encoding of chroma blocks, the quantized transform coefficients may also be fed into the de-quantization module 860 to recover the original scale of the transform coefficients. Then, the inverse transform module 870 may perform the inverse of the transform module 830 and generate a noisy version of the original residual block. Then, the lossy residual block may be fed into the reconstruction module 880, which may generate reconstructed luma and/or chroma samples for intra prediction of future chroma blocks. If desired, filtering may be performed on the reconstructed samples before they are used for intra prediction.

It should be noted that FIG. 8 may be a simplified illustration of a video encoder, thus it may include only part of modules present in the video encoder. Other modules (e.g., filter, scanner, and transmitter), although not shown in FIG. 8, may also be included to facilitate video encoding as understood by one of skill in the art. In addition, depending on the encoding scheme, some of the modules in the video encoder may be skipped. For example, in lossless encoding of certain video content, no information loss may be allowed, thus the quantization module 840 and the de-quantization module 860 may be skipped. For another example, if the residual block is encoded directly without being converted to transform coefficients, the transform module 830 and the inverse transform module 870 may be skipped. Moreover, prior to transmission from the encoder, the encoded bitstream may be configured to include other information, such as video resolution, frame rate, block partitioning information (sizes, coordinates), prediction modes, etc., so that the encoded sequence of video frames may be properly decoded by a video decoder.

Figure 9:
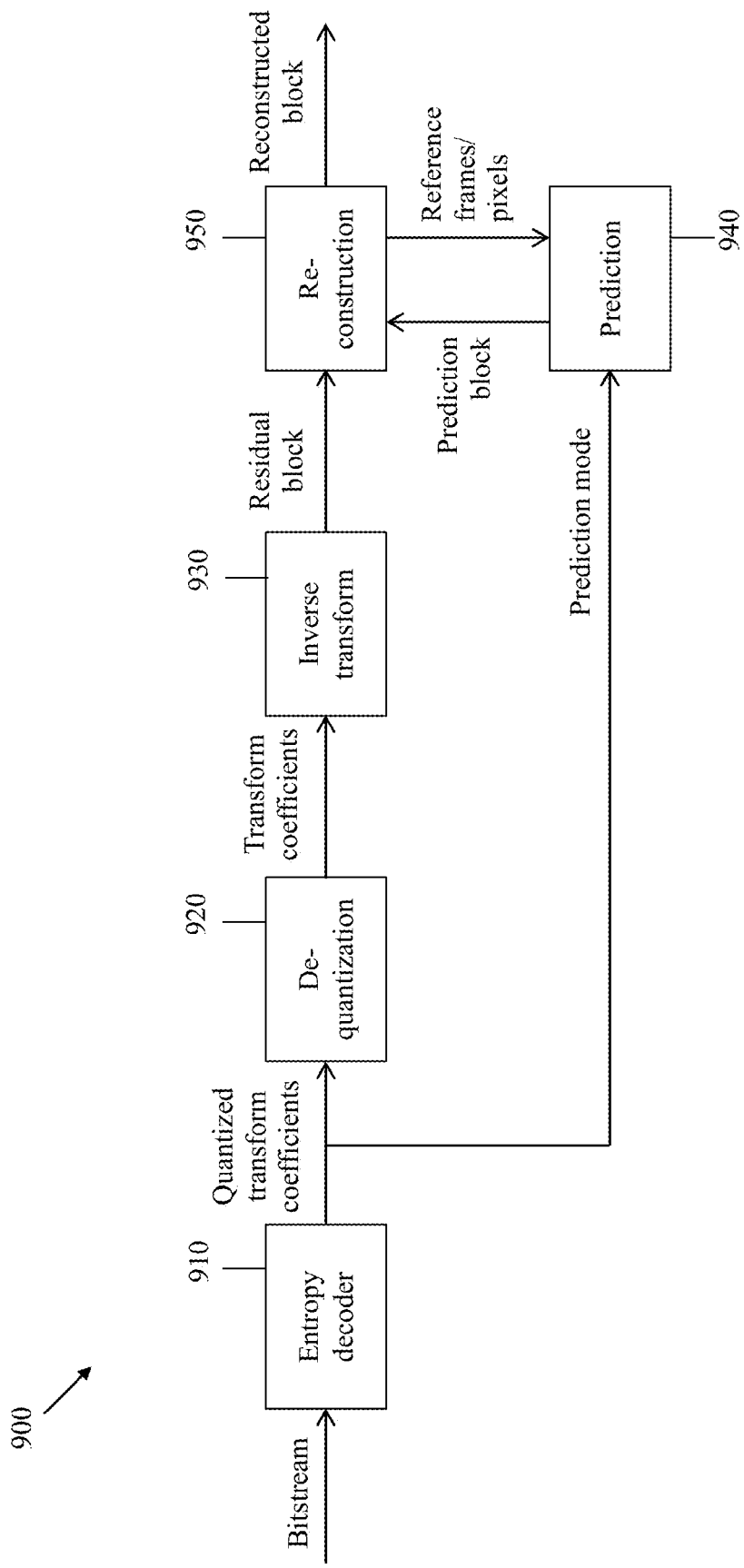
FIG. 9 is a schematic diagram of an embodiment of a video decoder.

FIG. 9 illustrates an embodiment of a video decoder 900, in which a disclosed angTable may be used for intra prediction. The video decoder 900 may correspond to the video encoder 800, and may comprise an entropy decoder 910, a de-quantization module 920, an inverse transform module 930, a prediction module 940, and a reconstruction module 950 arranged as shown in FIG. 9. In operation, an encoded bitstream containing information of a sequence of video frames may be received by the entropy decoder 910, which may decode the bitstream to an uncompressed format. A matrix of quantized transform coefficients may be generated, which may then be fed into the de-quantization module 920, which may be the same or similar to the de-quantization module 860 in FIG. 8. Then, output of the de-quantization module 920 may be fed into the inverse transform module 930, which may convert transform coefficients to residual values of a residual block. In addition, information containing a prediction mode (e.g., a directional intra prediction mode) of the current block may also be decoded by the entropy decoder 910. Based on the prediction mode, the prediction module 940 may generate a prediction block for the current block.

In an embodiment, the prediction module 940 is configured to use a disclosed angTable in computing an intra prediction block for a current chroma block. The prediction block comprises a plurality of predicted samples, each of which may be generated based on a plurality of reconstructed samples located in the left and upper neighboring blocks (already decoded) of the current block. Upon generation of the prediction block for the current block, the reconstruction module 950 may combine the residual chroma block with the prediction block to generate a reconstructed block. Additionally, to facilitate continuous decoding, some samples of the reconstructed block may also serve as reference pixels for intra prediction of future blocks in the same video slice or frame.

Figure 10:
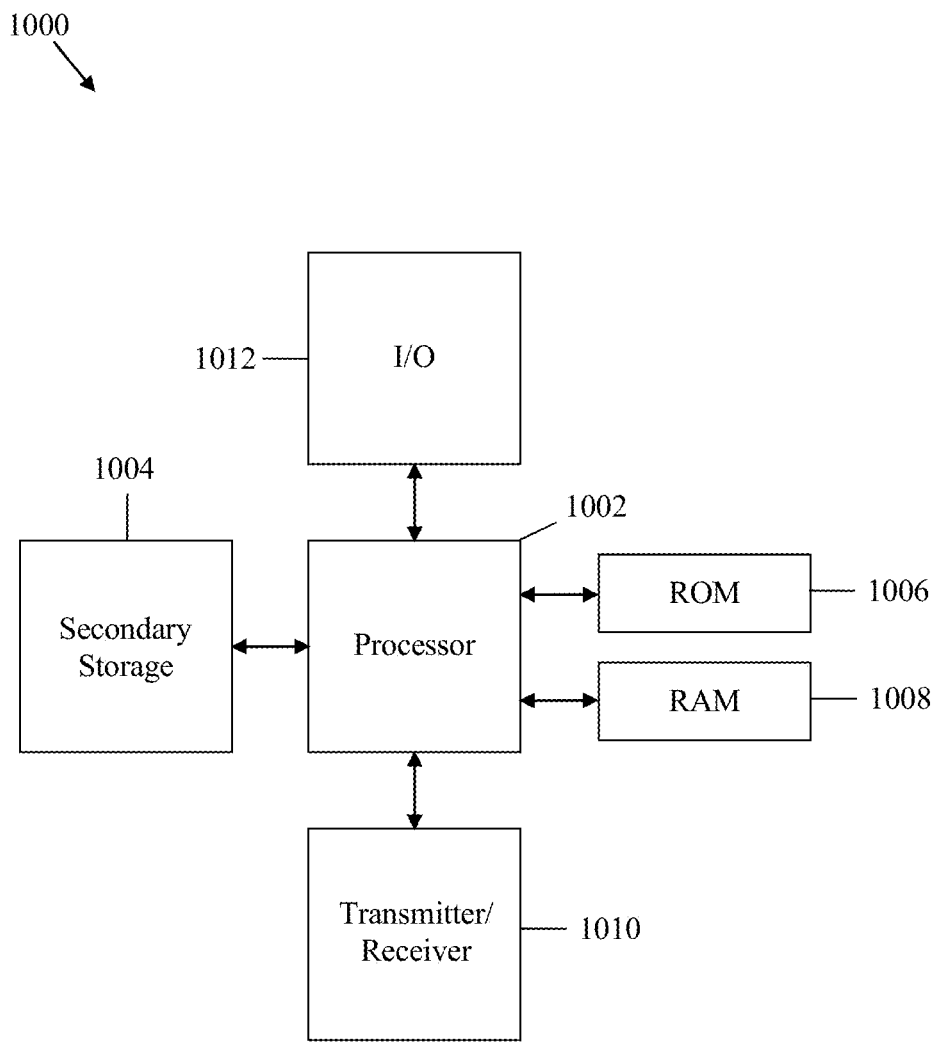
FIG. 10 is a schematic diagram of a general-purpose computer system.

The schemes described above may be implemented on any general-purpose computer system, such as a computer or network component with sufficient processing power, memory resources, and network throughput capability to handle the necessary workload placed upon it. FIG. 10 illustrates a schematic diagram of a general-purpose computer system 1000 suitable for implementing one or more embodiments of the methods disclosed herein, such as the intra prediction method 700, the video encoder 800, and the video decoder 900. The computer system 1000 includes a processor 1002 (which may be referred to as a central processor unit or CPU) that is in communication with memory devices including secondary storage 1004, read only memory (ROM) 1006, random access memory (RAM) 1008, transmitter/receiver 1010, and input/output (I/O) device 1012. Although illustrated as a single processor, the processor 1002 is not so limited and may comprise multiple processors. The processor 1002 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1002 may be configured to implement any of the schemes described herein, such as the intra prediction method 700, the video encoder 800, and the video decoder 900. The processor 1002 may be implemented using hardware, software, or both.

The secondary storage 1004 is typically comprised of one or more disk drives or tape drives and is used for non-volatile storage of data and as an over-flow data storage device if the RAM 1008 is not large enough to hold all working data. The secondary storage 1004 may be used to store programs that are loaded into the RAM 1008 when such programs are selected for execution. The ROM 1006 is used to store instructions and perhaps data that are read during program execution. The ROM 1006 is a non-volatile memory device that typically has a small memory capacity relative to the larger memory capacity of the secondary storage 1004. The RAM 1008 is used to store volatile data and perhaps to store instructions. Access to both the ROM 1006 and the RAM 1008 is typically faster than to the secondary storage 1004. The secondary storage 1004, ROM 1006, and/or RAM 1008 may be non-transitory computer readable mediums and may not include transitory, propagating signals. Any one of the secondary storage 1004, ROM 1006, or RAM 1008 may be referred to as a memory, or these modules may be collectively referred to as a memory. Any of the secondary storage 1004, ROM 1006, or RAM 1008 may be used to store an angTable described herein. The processor 1002 may generate the angTable and store the angTable in memory and/or retrieve the angTable from memory.

The transmitter/receiver 1010 may serve as an output and/or input device of the video codec 1000. For example, if the transmitter/receiver 1010 is acting as a transmitter, it may transmit data out of the computer system 1000. If the transmitter/receiver 1010 is acting as a receiver, it may receive data into the computer system 1000. The transmitter/receiver 1010 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1010 may enable the processor 1002 to communicate with an Internet or one or more intranets. I/O devices 1012 may include a video monitor, liquid crystal display (LCD), touch screen display, or other type of video display for displaying video, and may also include a video recording device for capturing video. I/O devices 1012 may also include one or more keyboards, mice, or track balls, or other well-known input devices.

It is understood that by programming and/or loading executable instructions onto the computer system 1000, at least one of the processor 1002, the RAM 1008, and the ROM 1006 are changed, transforming the computer system 1000 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of intra prediction comprising computing a prediction block for a luma block, wherein computing the prediction block includes using a plurality of directional intra prediction modes and an angular table (angTable) comprising a plurality of entries, wherein a value of each entry is determined via a mathematical derivation, wherein determining at least one of the entry values comprises computing $\ln(\sin(\theta_1))-\ln(\sin(\theta_0))$, wherein $\theta_0$ denotes a lower boundary angle of an angular interval, and wherein $\theta_1$ denotes an upper boundary angle of the angular interval, and wherein the angular interval is part of an angular range covered by the plurality of directional intra prediction modes.

2. The method of claim 1, wherein the mathematical derivation comprises calculating a weighting factor for the angular interval, wherein calculating the weighting factor comprises averaging weighting factors for a plurality of sub-intervals included in the angular interval.

3. method of claim 1, wherein the luma block is part of a video frame, wherein the prediction block is subtracted from the luma block to generate a residual block, wherein the residual block is transformed, quantized, and entropy encoded to generate an output bit stream.

4. The method of claim 1, further comprising:
computing a difference between the prediction block and the luma block to generate a residual block;
transforming the residual block to generate a plurality of transform coefficients;
quantizing the plurality of transform coefficients to generate a plurality of quantized transform coefficients; and
entropy encoding at least part of the plurality of quantized transform coefficients to generate an encoded bit stream.

5. The method of claim wherein determining at least one of the entry values comprises:
determining a lower boundary angle of the angular interval;
determining an upper boundary angle of the angular interval;
obtaining an equivalent averaging prediction angle (EAPA) in the angular interval, wherein the angular interval is part of an angular range covered by the plurality of directional intra prediction modes; and
computing at least one of the entry values based on the EAPA.

6. The method of claim 5, wherein the lower boundary angle is based on a pre-configured angular width greater than zero and smaller than $\pi/4$, the upper boundary angle is based on a pre-configured angular width greater than zero and smaller than $\pi/4$, and the EAPA is in an i-th angular interval of the angular range $[\pi/4+\Delta step, \pi/2]$, wherein i =0, 1, 2, 3, 4, 5, 6.

7. The method of claim 1, wherein determining at least one of the entry values further comprises:
computing an angular width of the angular interval; and
integer dividing $\ln(\sin(\theta_1))-\ln(\sin(\theta_0))$ by the angular width.

8. The method of claim 7, wherein a number of the directional intra prediction modes is 33.

9. The method of claim 7, wherein the angular range comprises a number of angular intervals including the angular interval.

10. The method of claim 9, wherein each angular interval is equal in the angular width.

11. A method of intra prediction comprising computing a prediction block for a luma block, wherein computing the prediction block includes using a plurality of directional intra prediction modes and an angular table (angTable) comprising a plurality of entries, wherein a value of each entry is determined via a mathematical derivation,
wherein determining K entry values comprises computing for integer i=0, 1, . . . , K−1, $$\theta_0 = (\pi/4 + i*(\pi/4 - \Delta step))/K,$$

$$\theta_1 = (\pi/4 + (i+1)*(\pi/4 - \Delta step))/K,$$

and $$\cot(\theta_{equ,i}) = \frac{\ln(\sin(\theta_1)) - \ln(\sin(\theta_0))}{\theta_1 - \theta_0},$$

wherein $\theta_{equ,i}$ denotes an equivalent averaging prediction angle (EAPA) in an i-th angular interval of an angular range $[\pi/4+\Delta step, \pi/2]$, wherein $\Delta step$ denotes a pre-configured angular width greater than zero and smaller than $\pi/4$, wherein the angular range is covered by the plurality of directional intra prediction modes, and wherein K is an integer greater than one.

12. The method of claim 11, wherein a number of the plurality of entries is nine, wherein two of the nine entries are zero and 32, wherein K=7, and wherein an (7−i)-th entry, denoted as angTable2[7−i], is computed using equation $$\text{angTable2}[7-i] = \text{round}(\cot(\theta_{equ,i}) * 32).$$

13. The method of claim 1, wherein a number of the plurality of entries equals 9, and wherein the entries values are {0, 2, 5, 9, 13, 18, 23, 28, 32}, {0, 2, 5, 9, 13, 18, 23, 29, 32}, {0, 2, 5, 9, 13, 18, 22, 28, 32}, {0, 2, 5, 9, 13, 17, 22, 27, 32}, {0, 2, 5, 9, 13, 17, 21, 27, 32}, {0, 2, 5, 9, 12, 17, 21, 26, 32}, or {0, 2, 5, 9, 12, 16, 21, 26, 32}.

14. The method of claim 1, further comprising computing a second prediction block for a chroma block, wherein the chroma block corresponds to the luma block, and wherein computing the second prediction block includes using the angTable.

15. The method of claim 8, wherein the luma block satisfies at least one of the conditions:
the luma block does not have any left neighboring block,
the luma block does not have any upper neighboring block,
no left neighboring block of the luma block has an intra prediction mode,
no upper neighboring block of the luma block has an intra prediction mode,
a left neighboring block has an intra prediction mode in modes 4, 7, 10, 11, 14, 15, 18, 19, 26, 27, and 34, and
an upper neighboring block has an intra prediction mode in modes 4, 7, 10, 11, 14, 15, 18, 19, 26, 27, and 34.

16. An apparatus comprising:
a memory configured to store an angular table (angTable) comprising a plurality of entries, wherein a value of each entry is determined via a mathematical derivation; and
a processor configured to compute a prediction block for a luma block using a plurality of directional intra prediction modes and the angTable,
wherein determining at least one of the entry values comprises computing $\ln(\sin(\theta_1)) - \ln(\sin(\theta_2))$, wherein $\theta_0$ denotes a lower boundary angle of an angular interval, and wherein $\theta_1$ denotes an upper boundary angle of the angular interval, and wherein the angular interval is part of an angular range covered by the plurality of directional intra prediction modes.

17. The apparatus of claim 16, wherein the mathematical derivation comprises calculating a weighting factor for the angular interval, wherein calculating the weighting factor comprises averaging weighting factors for a plurality of sub-intervals included in the angular interval.

18. The apparatus of claim 16, wherein determining at least one of the entry values further comprises:
computing an angular width of the angular interval; and
integer dividing $\ln(\sin(\theta_1)) - \ln(\sin(\theta_0))$ by the angular width.

19. The apparatus of claim 18, wherein a number of the directional intra prediction modes is 33.

20. The apparatus of claim 18, wherein the angular range comprises a number of angular intervals including the angular interval.

21. The apparatus of claim 20, wherein each angular interval is equal in the angular width.

22. An apparatus comprising:
a memory configured to store an angular table (angTable) comprising a plurality of entries, wherein a value of each entry is determined via a mathematical derivation; and
a processor configured to compute a prediction block for a luma block using a plurality of directional intra prediction modes and the angTable,
wherein determining K entry values comprises computing for integer i=0, 1, . . . , K−1, $$\theta_0 = (\pi/4 + i*(\pi/4 - \Delta\text{step}))/K,$$

$$\theta_1 = (\pi/4 + (i+1)*(\pi/4 - \Delta\text{step}))/K,$$

and $$\cot(\theta_{equ,i}) = \frac{\ln(\sin(\theta_1)) - \ln(\sin(\theta_0))}{\theta_1 - \theta_0},$$

wherein $\theta_{equ,i}$ denotes an equivalent averaging prediction angle (EAPA) in an i-th angular interval of an angular range $[\pi/4+\Delta\text{step}, \pi/2]$, wherein $\Delta\text{step}$ denotes a pre-configured angular width greater than zero and smaller than $\pi/4$, wherein the angular range is covered by the plurality of directional intra prediction modes, and wherein K is an integer greater than one.

23. The apparatus of claim 22, wherein a number of the plurality of entries is nine, wherein two of the nine entries are zero and 32, wherein K=7, and wherein an (7−i)-th entry, denoted as angTable2[7−], is computed using equation $$\text{angTable 2}[7-i] = \text{round}(\cot(\theta_{equ,i}) * 32).$$

24. The apparatus of claim 16, wherein a number of the plurality of entries equals 9, and wherein the entries values are {0, 2, 5, 9, 13, 18, 23, 28, 32}}, {0, 2, 5, 9, 13, 18, 23, 29, 32}, {0, 2, 5, 9, 13, 18, 22, 28, 32}, {0, 2, 5, 9, 13, 17, 22, 27, 32}, {0, 2, 5, 9, 13, 17, 21, 27, 32}, {0, 2, 5, 9, 12, 17, 21, 26, 32}, or {0, 2, 5, 9, 12, 16, 21, 26, 32}.

25. The apparatus of claim 16, wherein the processor is further configured to compute a second prediction block for a chroma block, wherein the chroma block corresponds to the luma block, and wherein computing the second prediction block includes using the angTable.

26. The apparatus of claim 19, wherein the memory is further configured to store a second angTable with entry values {0, 2, 5, 9, 13, 17, 21, 26, 32}, and wherein the processor is further configured to use the second angTable unless the luma block satisfies at least one of the following conditions:
the luma block does not have any left neighboring block,
the luma block does not have any upper neighboring block,
no left neighboring block of the luma block has an intra prediction mode,
no upper neighboring block of the luma block has an intra prediction mode,
a left neighboring block has an intra prediction mode in modes 4, 7, 10, 11, 14, 15, 18, 19, 26, 27, and 34, and
an upper neighboring block has an intra prediction mode in modes 4, 7, 10, 11, 14, 15, 18, 19, 26, 27, and 34.

27. A method comprising:
mathematically deriving a plurality of integers;
storing the plurality of integers in a memory; and
computing a prediction block for a luma block, wherein computing the prediction block includes using a plurality of directional intra prediction modes and the plurality of integers,
wherein mathematically deriving each of the plurality of integers comprises computing $\ln(\sin(\theta_1)) - \ln(\sin(\theta_0))$, wherein $\theta_0$ denotes a lower boundary angle of an angular interval, wherein $\theta_1$ denotes an upper boundary angle of the angular interval, and wherein the angular interval is part of an angular range covered by the plurality of directional intra prediction modes.

28. The method of claim 27, wherein mathematically deriving each of the plurality of integers further comprises:
computing an angular width of the angular interval; and
integer dividing $\ln(\sin(\theta_1))-\ln(\sin(\theta_0))$ by the angular width.

* * * * *